Patented Aug. 16, 1932

1,871,712

UNITED STATES PATENT OFFICE

CHARLES G. LLOYD, OF LA GRANGE, ILLINOIS, ASSIGNOR TO ALUMINUM COMPANY OF AMERICA, OF PITTSBURGH, PENNSYLVANIA, A CORPORATION OF PENNSYLVANIA

METHOD OF ELECTRIC SHEET-WELDING

No Drawing. Original application filed February 7, 1929, Serial No. 338,208. Divided and this application filed February 20, 1930. Serial No. 430,109.

My invention pertains to the welding together of thin metallic sheets, such as the foils of aluminum and kindred metals.

The object of the invention is to provide a method by which thin metallic sheets, such, for instance, as the metallic foils, can be welded together easily and rapidly. One field of usefulness is in the manufacture of foil, for example, aluminum foil, where it frequently occurs that the web of foil becomes torn between the "On" roll and the "Off" roll during rewinding. To reunite the torn ends of the web of foil satisfactorily and quickly has heretofore presented a material problem, which is solved by my invention.

In practicing my invention, I superimpose one metallic sheet upon another, and make a closed circuit connection between said sheets and an electrode. I then make contact between the top sheet and a second electrode, and by continuously drawing away the said second electrode from the top sheet, create an electric arc between the top sheet and said second electrode. I find that by the mere drawing away of the second electrode, so that the arc is formed, lengthened and extinguished, without any material pause, the metal is melted, and thus the sheets are fused together at the point where the arc has been drawn. The process may be repeated at a number of points, as in ordinary spot welding.

As an example of one manner of carrying out my improved method, I may refer to the reuniting of the ends of a web of aluminum foil which has become torn, for instance during winding from one roll to another. In such case, one lead of an electric circuit,— which may be, for example, a 110 volt A. C. lighting circuit, stepped down to about 10 volts by a transformer,—is connected to the foil. This may be conveniently done, of course, by grounding the circuit lead to the machine in which the foil is being worked upon. The other lead of the circuit is connected to an electrode. With one of the torn ends of the foil lapped upon the other, the electrode is pressed upon the superimposed ends, so as to apply pressure therebetween, and continuously withdrawn without appreciable pause, so as to create, lengthen and extinguish an arc between the foil and the electrode. This results in the metal being melted at the point where the arc is created, and, in the case of aluminum and similar foils, in the formation of a perforation at that point, the metal of the superimposed ends being fused together around the edge of such perforation. A strong weld is thus obtained. The arc is drawn at as many points as are necessary to give the required strength to the joint between the ends of the web of foil, resulting in a row of perforations of the desired number. Where more than two layers of foil are to be joined the same procedure is followed, as the heat of the arc, though created by the mere contacting of the electrode and continuous withdrawal thereof without material pause, is sufficient to melt the metal through a number of layers.

An especially easy, rapid and convenient way of carrying out this method of welding is by means of an electrode tool adapted to make and break electric contact with the metal being welded at a series of spaced points as the tool is moved over this metal in such a manner as to apply pressure thereto, such as the electrode wheel disclosed in my copending application Serial No. 338,208, filed February 7, 1929, of which the present application is a division.

I claim:

The method of uniting thin metallic sheets which consists in superimposing one sheet upon another, contacting an electrode with one of said sheets, effecting continuous relative transverse movement between said sheets and said electrode to bring the latter towards a new point of contact, and, simultaneously during said transverse movement first withdrawing said electrode gradually from said sheet until the arc between the electrode and the sheet is extinguished and then moving the electrode towards the sheet until contact is again established at a new point.

In testimony thereof, I sign my name.

CHARLES G. LLOYD.